US010016978B2

(12) United States Patent
Kakutani (10) Patent No.: US 10,016,978 B2
(45) Date of Patent: Jul. 10, 2018

(54) PRINTING APPARATUS, PRINTING METHOD, AND NON-TRANSITORY COMPUTER READABLE MEDIUM FOR STORING PROGRAM

(71) Applicant: SEIKO EPSON CORPORATION, Tokyo (JP)

(72) Inventor: Toshiaki Kakutani, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/695,458

(22) Filed: Sep. 5, 2017

(65) Prior Publication Data

US 2018/0079212 A1 Mar. 22, 2018

(30) Foreign Application Priority Data

Sep. 16, 2016 (JP) ................................. 2016-181209

(51) Int. Cl.
*B41J 29/38* (2006.01)
*B41J 2/15* (2006.01)
*G06K 15/10* (2006.01)

(52) U.S. Cl.
CPC .............. *B41J 2/15* (2013.01); *G06K 15/105* (2013.01); *G06K 2215/0094* (2013.01); *G06K 2215/101* (2013.01)

(58) Field of Classification Search
USPC ........................................... 347/5, 9, 12, 43
See application file for complete search history.

(56) References Cited

U.S. PATENT DOCUMENTS

| 8,517,494 | B2 | 8/2013 | Kakutani | |
| 8,730,520 | B2 | 5/2014 | Konno et al. | |
| 8,770,693 | B2* | 7/2014 | Tanaka | G06K 15/107 347/12 |
| 2010/0053247 | A1* | 3/2010 | Kakutani | B41J 2/2107 347/12 |
| 2010/0118077 | A1* | 5/2010 | Kakutani | B41J 2/2107 347/12 |

FOREIGN PATENT DOCUMENTS

| JP | 5539119 B2 | 7/2014 |
| JP | 5633110 B2 | 12/2014 |

* cited by examiner

*Primary Examiner* — Lam Nguyen (57) ABSTRACT

A printing apparatus has a plurality of nozzles including preceding nozzles that discharge ink onto a printing medium before ink discharge of the other nozzles, and succeeding nozzles that discharge ink onto the printing medium after the ink discharge of the preceding nozzles, and if the amount of black ink discharged on the printing target region is larger than a predetermined amount, the printing apparatus discharges a smaller amount of chromatic ink than the amount of the discharged black ink onto the printing target region from the plurality of nozzles so that the amount of the chromatic ink discharged from the succeeding nozzles is larger than the amount of the chromatic ink discharged from the preceding nozzles.

5 Claims, 9 Drawing Sheets

| 10 | 3  | 10 | 3  | 10 | 3  | 10 | 3  |
|----|----|----|----|----|----|----|----|
| 7  | 7  | 0  | 7  | 7  | 7  | 7  | 7  |
| 4  | 4  | 11 | 4  | 11 | 4  | 4  | 11 |
| 1  | 8  | 8  | 8  | 8  | 1  | 8  | 8  |
| 5  | 12 | 5  | 5  | 5  | 5  | 12 | 5  |
| 9  | 9  | 2  | 9  | 2  | 9  | 9  | 2  |
| 6  | 6  | 6  | 6  | 13 | 6  | 6  | 6  |

| 3 | 10 | 3 | 3 | 3 | 10 | 3 | 3 |
|---|---|---|---|---|---|---|---|
| 0 | 0 | 0 | 7 | 0 | 0 | 0 | 7 |
| 4 | 4 | 11 | 4 | 4 | 4 | 11 | 4 |
| 8 | 1 | 1 | 1 | 8 | 1 | 1 | 1 |
| 5 | 12 | 5 | 5 | 5 | 12 | 5 | 5 |
| 2 | 2 | 9 | 2 | 2 | 2 | 9 | 2 |
| 13 | 6 | 6 | 6 | 13 | 6 | 6 | 6 |

PRINTING APPARATUS, PRINTING METHOD, AND NON-TRANSITORY COMPUTER READABLE MEDIUM FOR STORING PROGRAM

BACKGROUND

1. Technical Field

The present invention relates to a printing apparatus, a printing method, and a non-transitory computer readable medium for storing program.

2. Related Art

Traditionally, in a serial printing apparatus, a print head scans a common region on a printing medium multiple times and forms ink dots, thereby printing an image. Regarding serial printing apparatuses of this type, printing apparatuses that use pigment ink containing pigments as color materials have increased in number. As a problem with the serial printing apparatuses that use pigment ink, bronzing in which a printed surface appears to have a bronze color when the surface is viewed from a certain angle is known, as described in Japan Patent No. 5539119.

In general, in order to obtain high-gloss output with pigment ink, ink containing not only a pigment composition but also a resin composition is used. As the amount of the resin composition is increased, high-gloss output is more easily achieved. The amount of the resin composition contained in the ink, however, is limited, and it is difficult to create ink sufficiently containing both resin composition and pigment composition. Thus, when high-density printing is executed with black ink containing a large amount of a pigment composition and a relatively small amount of a resin composition, a gloss level is reduced and the density of output color ink appears to be reduced due to the diffused reflection of light. Specifically, when a certain amount or more of black ink is printed in the same printing region, the visual density does not sufficiently increase and an effect in which the density appears to be reduced occurs. When an image is formed by executing multiple scans and discharging ink, and the number of scans or a time interval between scans is reduced for faster printing, this effect may easily occur.

This effect may be recognized as gloss unevenness when a whole printed image is viewed. Such gloss unevenness is noticeable for a printer that causes time intervals between main scans to vary depending on regions to be printed, like a serial printer that forms an image by executing multiple main scans. In addition, such gloss unevenness is especially noticeable in a printing mode that is a bidirectional printing mode or the like and in which a time difference relationship is reversed for each sub-scan at both ends in a main scan direction. The invention aims to suppress gloss unevenness that occurs when the amount of a pigment composition per unit area is relatively large. The invention also aims to solve an effect that has been tried to be solved by Japanese Patent No. 5539119 and is completely different from bronzing that occurs even if the amount of a pigment composition is relatively small.

SUMMARY

An advantage of some aspects of the invention is that it solves at least a part of the aforementioned problems, and the invention can be achieved as the following aspects.

(1) According to an aspect of the invention, a printing apparatus is provided. The printing apparatus includes a print head that has a plurality of nozzles capable of discharging black ink and chromatic ink and is driven relative to a printing medium in a main scan direction that is a width direction of the printing medium and in a sub-scan direction intersecting the main scan direction, an acquiring section that acquires image data, and a dot forming section that forms dots based on the image data on the printing medium by causing the print head to discharge the ink onto the printing medium while causing the print head to scan a common printing region in the main scan direction multiple times; the plurality of nozzles include preceding nozzles that discharge the ink onto the printing medium before the ink discharge of the other nozzles, and succeeding nozzles that discharge the ink onto the printing medium after the ink discharge of the preceding nozzles; the dot forming section controls a usage rate of at least any of nozzles included in the preceding nozzles and nozzles included in the succeeding nozzles and controls the amount of at least the chromatic ink to be discharged onto a printing target region in a preceding pass in which a scan is executed in the main scan direction while dots are formed using the preceding nozzles and a succeeding pass in which a scan is executed in the main scan direction while dots are formed using the succeeding nozzles; and if the amount of the black ink discharged on the printing target region is larger than a predetermined amount, the dot forming section causes the print head to discharge a smaller amount of the chromatic ink than the amount of the discharged black ink onto the printing target region from the plurality of nozzles so that the amount of the chromatic ink discharged from the succeeding nozzles is larger than the amount of the chromatic ink discharged from the preceding nozzles. According to the printing apparatus according to the aspect, if a dark black color is output using the black ink containing a small amount of a resin composition, the chromatic ink containing a large amount of a resin composition can be discharged mainly from the succeeding nozzles, a large amount of the resin composition can remain on the surface of the printing medium, and the occurrence of gloss unevenness can be suppressed. Thus, even a printing apparatus that does not have achromatic ink other than black ink can suppress the occurrence of gloss unevenness.

(2) In the printing apparatus according to the aspect, when the amount of the chromatic ink discharged on the common printing region is smaller than a predetermined amount, the dot forming section may cause the print head to discharge the chromatic ink from at least any of the plurality of nozzles so that the amount of the chromatic ink discharged from the succeeding nozzles is larger than the amount of the chromatic ink discharged from the preceding nozzles. According to the printing apparatus according to the aspect, since a small amount of the chromatic ink containing a large amount of the resin composition is discharged in a succeeding main scan, a large amount of the resin composition can remain on the surface, and the occurrence of gloss unevenness can be suppressed. Thus, even a printing apparatus that does not have achromatic ink other than black ink can suppress the occurrence of gloss unevenness.

(3) In the printing apparatus according to the aspect, the dot forming section may determine the formation of dots by comparing a plurality of thresholds included in a dither mask with pixel data forming the image data; and in the dither mask, thresholds corresponding to positions at which dots are formed by the succeeding nozzles that discharge the chromatic ink may be set to values that cause dots to be more easily formed than thresholds corresponding to positions at which dots are formed by the succeeding nozzles that discharge the chromatic ink. According to the printing apparatus according to the aspect, a halftone process and the determination of usage rates of the nozzles can be executed by only using the dither mask. Thus, the speed of a printing process can be increased.

Various aspects of the invention can be achieved. For example, according to other aspects of the invention, a printing method and a computer program are provided. The computer program may be recorded in a computer-readable recording medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
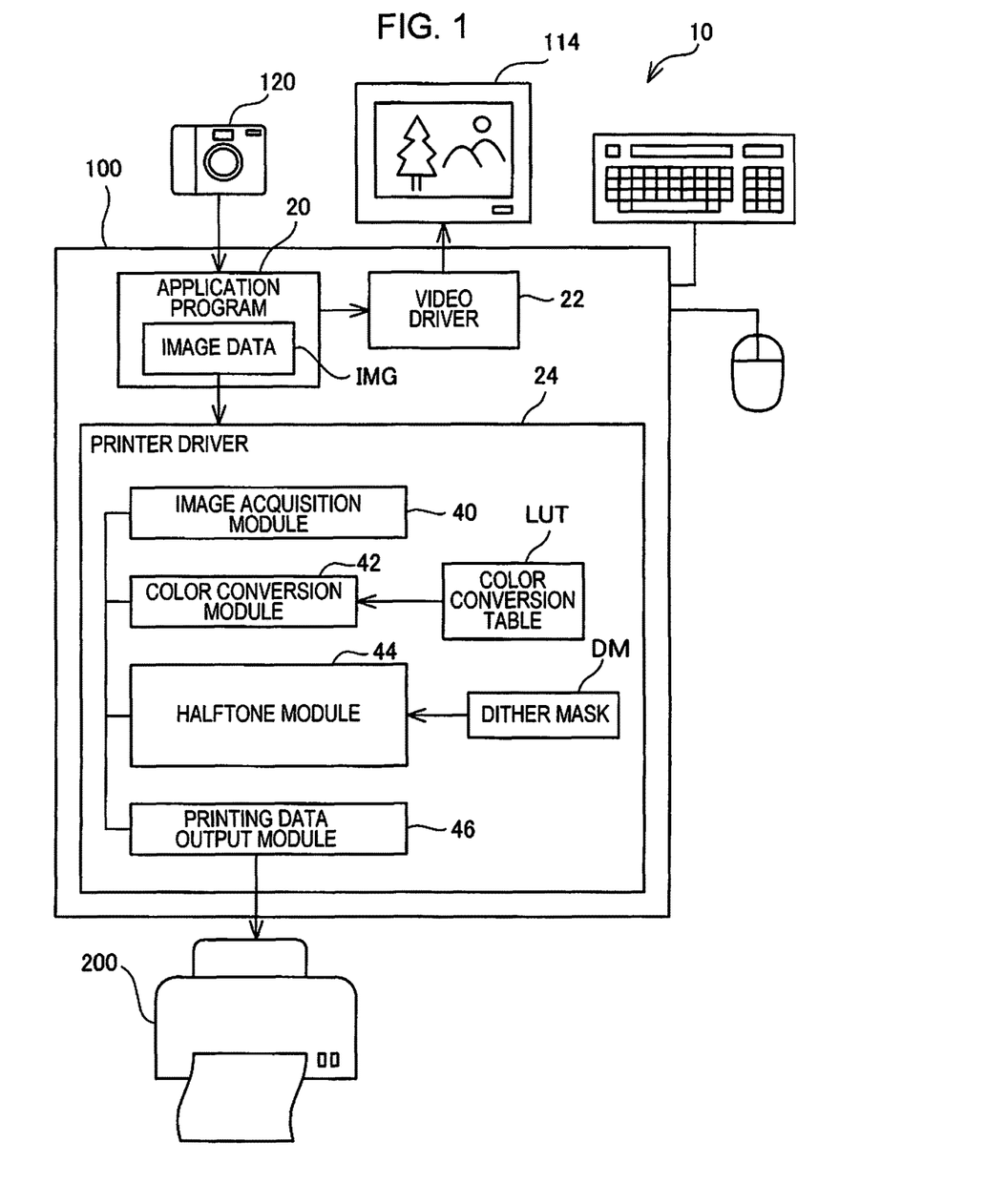
FIG. 1 is a diagram showing a schematic configuration of a printing system.

FIG. 1 is a diagram showing a schematic configuration of a printing system 10 according to a first embodiment of the invention. As shown in FIG. 1, the printing system 10 according to the first embodiment includes a computer 100 and a printer 200 configured to actually print an image under control of the computer 100. The printing system 10 as a whole functions as a printing apparatus in a broad sense.

In the computer 100 shown in FIG. 1, a predetermined operating system is installed and an application program 20 is executed under the operating system. A video driver 22 and a printer driver 24 are included in the operating system. The application program 20 receives image data IMG from a digital camera 120 via a peripheral device interface or the like, for example. Then, the application program 20 causes a display 114 to display an image represented by the image data IMG via the video driver 22. In addition, the video program 20 outputs the image data IMG to the printer 200 via the printer driver 24. The image data IMG received by the application program 20 from the digital camera 120 is color data of three color compositions of red (R), green (G), and blue (B) or is monochrome data of only a single color composition.

The printer driver 24 corresponds to a "dot forming section" in the present application and achieves a "dot formation function". The printer driver 24 includes an image acquisition module 40, a color conversion module 42, a halftone module 44, and a printing data output module 46. The image acquisition module 40 corresponds to an "acquiring section" in the present application and achieves an "acquisition function". The image acquisition module 40 acquires, from the application program 20, the image data to be printed.

The color conversion module 42 references a color conversion table LUT prepared in advance and converts the color compositions R, G, and B of the image data to color compositions (cyan (C), magenta (M), yellow (Y), and black (K)) that can be reproduced by the printer 200.

The halftone module 44 executes a halftone process of reproducing the image data after the color conversion using a distribution of dots. Specifically, the halftone module 44 executes the halftone process using a dither mask DM.

The printing data output module 46 sorts data obtained by the halftone process and indicating the arrangement of the dots of colors in the order in which the dots are formed by the print head 241 of the printer 200, and outputs the data as printing data to the printer 200.

In the first embodiment, usage rates of the nozzles included in the print head 241 described later are set based on the colors of the image data. If black ink is discharged with a high ink duty, a small amount of chromatic ink is used together with the black ink. In this case, the chromatic ink is discharged mainly in a succeeding pass among multiple main scan passes in which the same region is scanned. The ink duty indicates a dot recording rate in a predetermined printing region. The printing system 10 prints chromatic ink containing a large amount of a resin composition effective to improve gloss mainly in a succeeding pass and efficiently suppresses gloss unevenness by using a small amount of the chromatic ink so that the resin composition can easily remain on a surface of a printing material. The principle of printing the chromatic ink afterward is described later in detail.

In the first embodiment, the "chromatic ink" is at least any of cyan (C) ink, magenta (M) ink, and yellow (Y) ink. In addition, the "chromatic ink" may include chromatic ink with a normal density, light cyan (Lc) ink with a density lower than the normal density, and light magenta (Lm) ink with a density lower than the normal density. In this case, the "chromatic ink" may include light ink.

Figure 2:
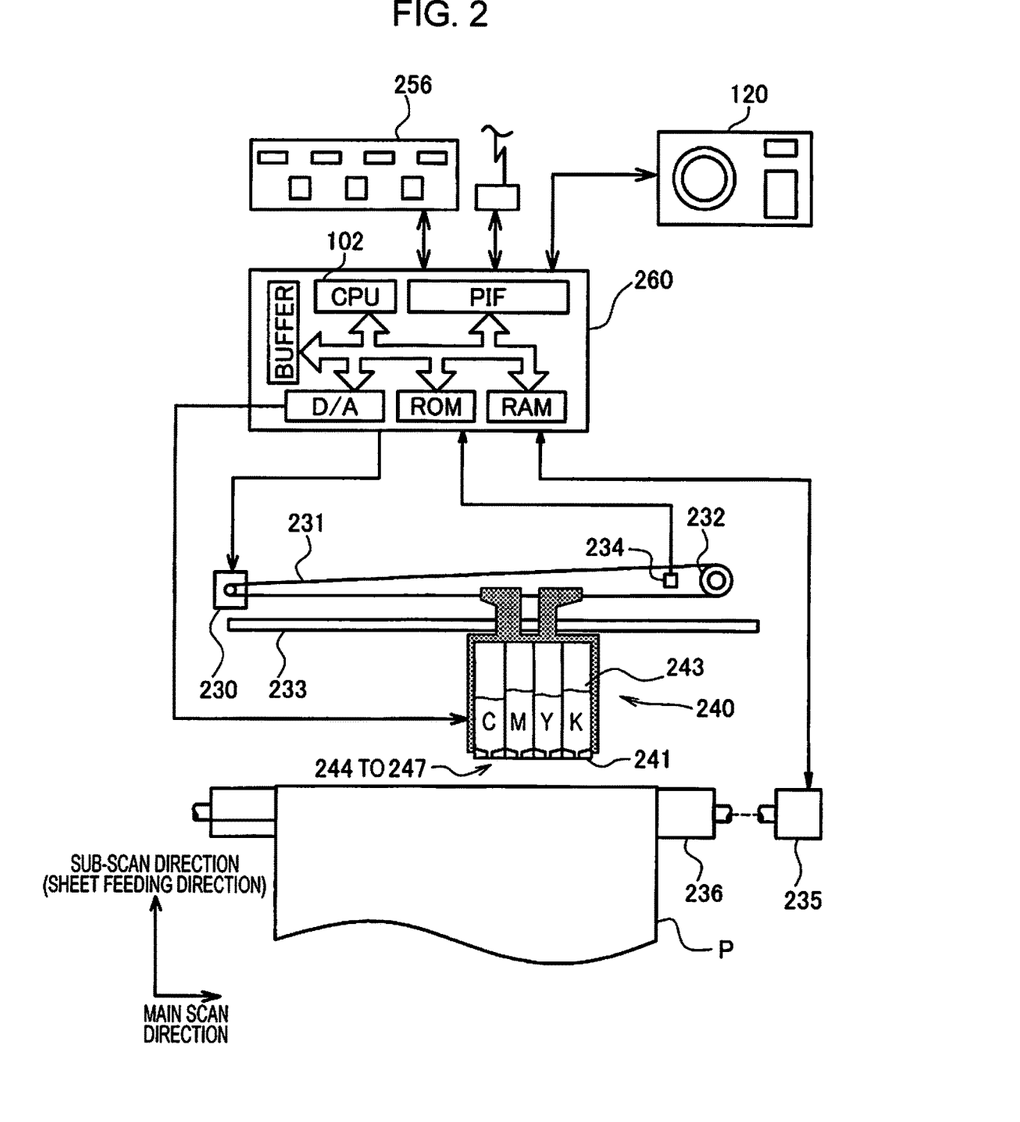
FIG. 2 is a diagram showing a schematic configuration of a printer.

FIG. 2 is a diagram showing a schematic configuration of the printer 200. The printer 200 is a so-called serial printer and includes a transporting mechanism for transporting a printing medium P with a sheet feeding motor 235 in a sub-scan direction; a main scan mechanism for transporting a carriage 240 with a carriage motor 230 multiple times in an axial direction of a platen 236 or a main scan direction that is a width direction of the printing medium P; a mechanism for driving the print head 241 mounted on the carriage 240 to cause the print head 241 to discharge ink and form dots; and a control circuit 260 that controls the transmission and reception of signals between the sheet feeding motor 235, the carriage motor 230, the print head 241, and an operation panel 256. As the printing medium P, a glossy medium with a surface coated with synthetic resin may be used, for example.

The main scanning mechanism that causes the carriage 240 to reciprocate in the axial direction of the platen 236 includes a sliding shaft 233 extending along the axis of the platen 236 and holding the carriage 240 so that the carriage 240 is slidable; a pulley 232 supporting an endless driving belt 231 stretched between the pulley 232 and the carriage motor 230; and a position detection sensor 234 that detects the position of the origin of the carriage 240.

Multiple ink cartridges 243 storing cyan (C) ink, magenta (M) ink, yellow (Y) ink, and black (K) ink are attached to the carriage 240. In the first embodiment, color materials of the ink are pigments. The ink contains not only pigment compositions but also resin compositions for improving gloss. The amounts of pigment compositions that can be contained in the ink and the amounts of resin compositions that can be contained in the ink, however, are limited. Since the black (K) ink contains a large amount of a pigment composition, the amount of a resin composition that can be contained in the black ink are small. Thus, the black ink contains a relatively small amount of a resin composition. The chromatic (C, M, and Y) ink can contain larger amounts of resin compositions than the amount of the resin composition contained in the black (K) ink. If the chromatic ink includes chromatic (C, M, and Y) ink with normal densities and light (Lc and Lm) ink with low densities, the light ink contains smaller amounts of pigment compositions than the amounts of pigment compositions contained in the dark (C and M) ink having the same phases as the light ink, and can contain larger amounts of resin compositions. Each of nozzle strings 244 to 247 that discharge ink is formed for a respective color on the print head 241 mounted on a lower portion of the carriage 240.

Figure 3:
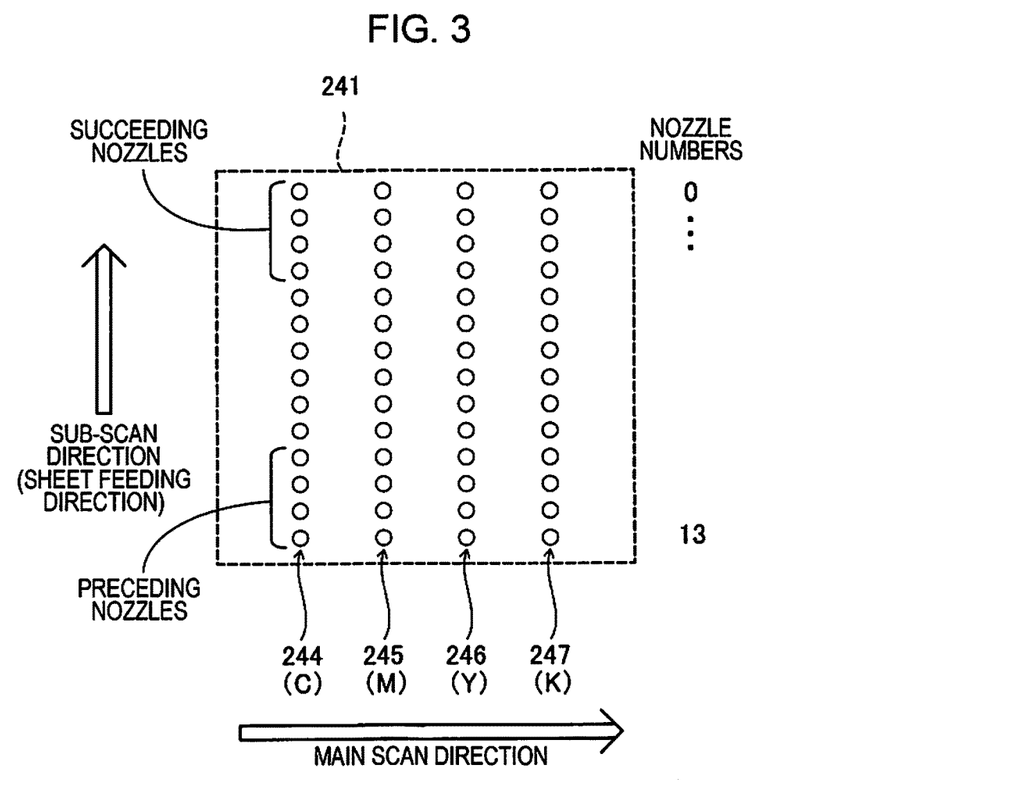
FIG. 3 is a diagram showing the arrangement of nozzle strings formed on a bottom surface of a print head when viewed from the side of a carriage.

FIG. 3 is a diagram showing the arrangement of the nozzle strings formed on a bottom surface of the print head 241 when viewed from the side of the carriage 240. As shown in FIG. 3, the print head 241 includes the nozzle strings 244 to 247, each of which has multiple nozzles arranged side by side in the sub-scan direction intersecting the main scan direction. In the first embodiment, each of the nozzle strings has 14 nozzles. The ink is supplied to the nozzle strings 244 to 247 from the ink cartridges 243 attached to the carriage 240, and the nozzle strings 244 to 247 can discharge the cyan (C) ink, the magenta (M) ink, the yellow (Y) ink, and the black (K) ink. In the following description, nozzle numbers of nozzles located on the front end side with respect to the sub-scan direction are "13", and nozzle numbers of nozzles located on the rear end side with respect to the sub-scan direction are "0". As shown in FIG. 3, in the first embodiment, nozzles included in each of the nozzle strings corresponding to the ink colors are arranged side by side in a single column in the sub-scan direction. The arrangement of nozzles included in each of the nozzle strings, however, is not limited. For example, nozzles for each color may be arranged in multiple columns or arranged in a zigzag pattern.

As shown in FIG. 2, the control circuit 260 included in the printer 200 includes a CPU 102, a ROM, a RAM, and a peripheral device interface (PIF) that are connected to each other via a bus. When receiving the printing data output from the computer 100 via the PIF, the control circuit 260 drives the carriage motor 230 to cause the print head 241 to reciprocate toward and away from the printing medium P multiple times in the main scan direction and drives the sheet feeding motor 235 to move the printing medium P in the sub-scan direction. The control circuit 260 drives the nozzles at appropriate time based on the printing data in coordination with the reciprocation movement (main scan) of the carriage 240 and the movement (sub-scan) of the printing medium by sheet feeding, thereby causing the nozzles to form ink dots of appropriate colors at appropriate positions on the printing medium P. By executing this operation, the printer 200 can print a color image on the printing medium P. In the first embodiment, the printing medium is transported in the sub-scan direction. In the first embodiment, however, the position of the printing medium may be fixed and the carriage 240 may be transported in the sub-scan direction. Specifically, the print head 241 may be driven relative to the printing medium P in the main scan direction and the sub-scan direction.

In the first embodiment, in the driving and control of the print head 241, the number of nozzles for each color is 14, each nozzle pitch is 2, and a sheet feeding amount is 7. In the first embodiment, bidirectional printing is executed to discharge the ink upon both forward and backward movements of the print head 241. Each nozzle pitch is a gap between two nozzles formed in a nozzle string. In the first embodiment, since each nozzle pitch is "2", dots are formed for every other line in a single main scan of the print head 241. If a region for 7 lines corresponding to the sheet feeding amount that is the amount of sheet feeding executed one time is paid attention, dots are formed by 4 nozzles located on the front end side and having nozzle numbers 10 to 13 in every other line in a first main scan pass or a preceding pass, dots are formed by 3 nozzles having nozzle numbers 7 to 9 in lines located between the lines of the first main scan pass in a second main scan pass, 4 nozzles having nozzle numbers 3 to 6 scan the same lines as the lines of the first main scan pass while overlapping the same lines as the lines of the first main scan pass in a third main scan pass, and 3 nozzles located on the rear end side and having nozzle numbers 0 to 2 scan the same lines as the lines of the second main scan pass while overlapping the same lines as the lines of the second main scan pass in a fourth main scan pass or a succeeding pass.

As described above, the printing system 10 according to the first embodiment includes a function of suppressing gloss unevenness. In order to achieve the function, the printing system 10 controls the usage rates of the nozzles so that usage rates of nozzles that are among nozzles included in nozzle strings for discharging chromatic ink and are located on the rear end side with respect to the sub-scan direction are higher than usage rates of nozzles that are among the nozzles included in the nozzle strings for discharging chromatic ink and are located on the front end side with respect to the sub-scan direction. Hereinafter, the nozzles, located on the rear end side, with usage rates to be increased are referred to as "succeeding nozzles", while the nozzles, located on the front end side, with usage rates to be relatively reduced are referred to as "preceding nozzles". Specifically, if the same region is completed by multiple main scan passes, nozzles to be used for a preceding pass are preceding nozzles, and nozzles to be used for a succeeding pass are succeeding nozzles. If the number of scans is odd, nozzles to be used for a middle pass may not belong to the preceding and succeeding passes. Since the preceding nozzles are used for a main scan pass to be carried out before scan passes to be carried out with the other nozzles including the succeeding nozzles, the preceding nozzles discharge the ink before the ink discharge of the other nozzles (in other words, the succeeding nozzles discharge the ink after the ink discharge of the preceding nozzles). In the first embodiment, the number of the nozzles with usage rates to be increased is equal to the number of nozzles included in a region corresponding to the sheet feeding amount by which the print head 241 is moved in the sub-scan direction in a single sub-scan (the number of nozzles with usage rates to be increased is 4 in the first embodiment). As shown in FIG. 3, in the first embodiment, the succeeding nozzles have the nozzle numbers 0 to 3, and the preceding nozzles have the nozzle numbers 10 to 13.

Figure 4:
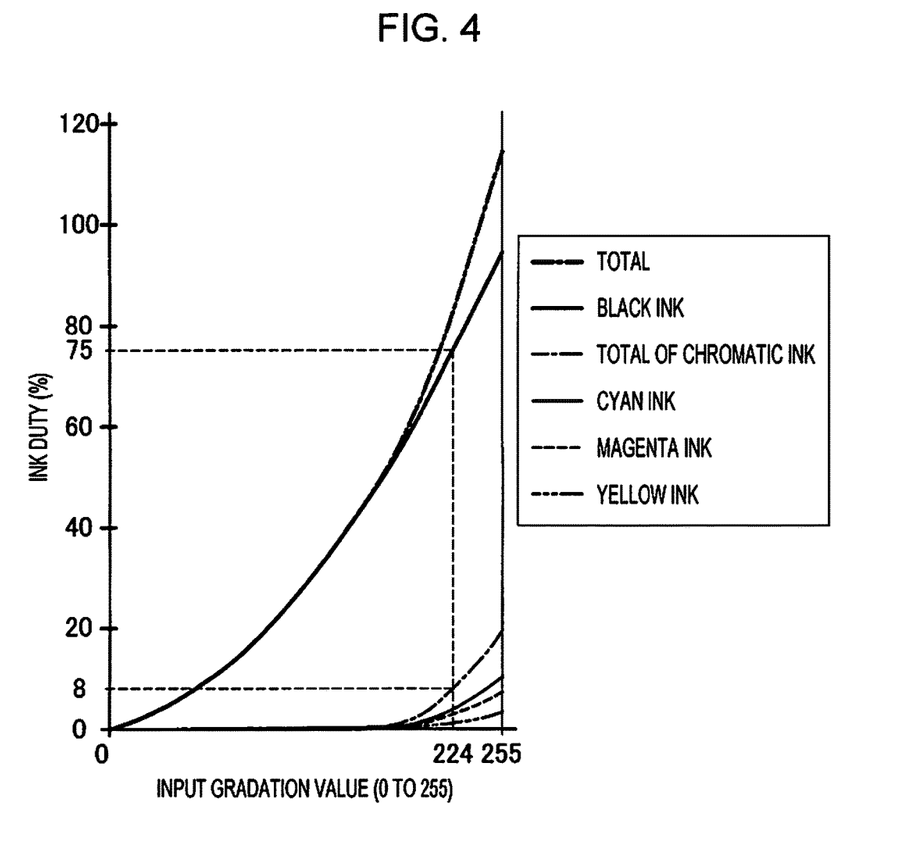
FIG. 4 is a diagram showing an example of ink duties with respect to an input gradation value of monochrome data.

FIG. 4 is a diagram showing an example of ink duties with respect to an input gradation value upon printing of monochrome image data in which 0 indicates white and 255 indicates black. In FIG. 4, the ordinate indicates the ink duties and the abscissa indicates the input gradation value. In FIG. 4, the input gradation value is in a range of 0 to 255. As the input gradation value is increased (or becomes closer to 255), the density of an image corresponding to the input gradation value is increased. As the input gradation value is reduced (or becomes closer to 0), the density of the image corresponding to the input gradation value is reduced. FIG. 4 shows the ink duties of the chromatic ink of the three colors, cyan, magenta, and yellow, the total of the ink duties of the chromatic ink, the ink duty of the black ink, and the total of the ink duties of all the ink.

As shown in FIG. 4, in the first embodiment, as the input gradation value is increased, the ink duty of the black ink is increased. On the other hand, regarding each of the ink duties of the chromatic ink, if values (R, G, B) of the input RGB color data are (0 to 10, 0 to 10, 0 to 10) and the input gradation value is a certain value (approximately 224 in the first embodiment) causing the ink duty of the black ink to be a predetermined value (approximately 75% in the first embodiment), the total of the ink duties of the chromatic ink is 8%. If the input gradation value is 255, the total of the ink duties of the chromatic ink reaches 20% (specifically, the ink duty of the cyan ink is 10%, the ink duty of the magenta ink is 7%, and the ink duty of the yellow ink is 3%). Specifically, in the first embodiment, when the amount of the black ink discharged on a printing target region is larger than a predetermined amount, a smaller amount of the chromatic ink than the amount of the discharged black ink is discharged onto the printing target region.

Figure 5:
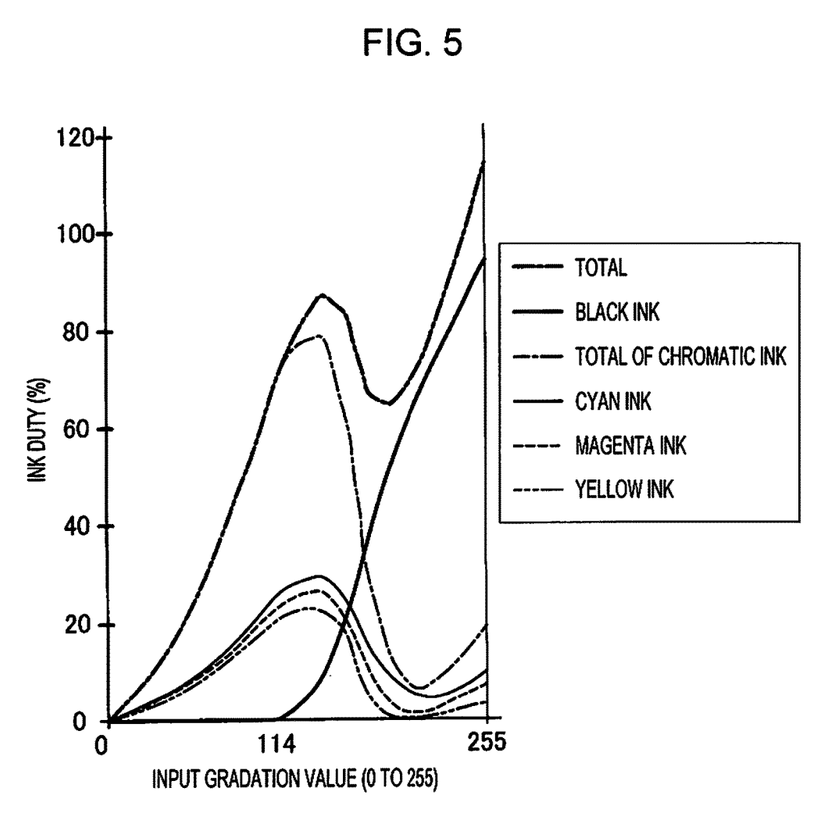
FIG. 5 is a diagram showing another example of the ink duties with respect to the input gradation value of the monochrome data.

FIG. 5 is a diagram showing another example of the ink duties with respect to the input gradation value upon the printing of the monochrome image data in which 0 indicates white and 255 indicates black. In the example shown in FIG. 4, if the input gradation value is small, gray is represented only using the black ink. On the other hand, as shown in FIG. 5, if the input gradation value is smaller than a predetermined value (approximately 114 or less), a light portion of gray may be represented by using a mixed color of chromatic ink instead of the black ink. In the first embodiment, in order to improve gloss, the chromatic ink containing large amounts of resin compositions is used so that gray balance of the black ink is not disturbed. Thus, if the actual gray balance deviates from desired characteristics due to the discharge of the chromatic ink, the balance of the values of the chromatic ink (shown in FIGS. 4 and 5) of the three colors (C, M, and Y) is appropriately adjusted.

Figure 6:
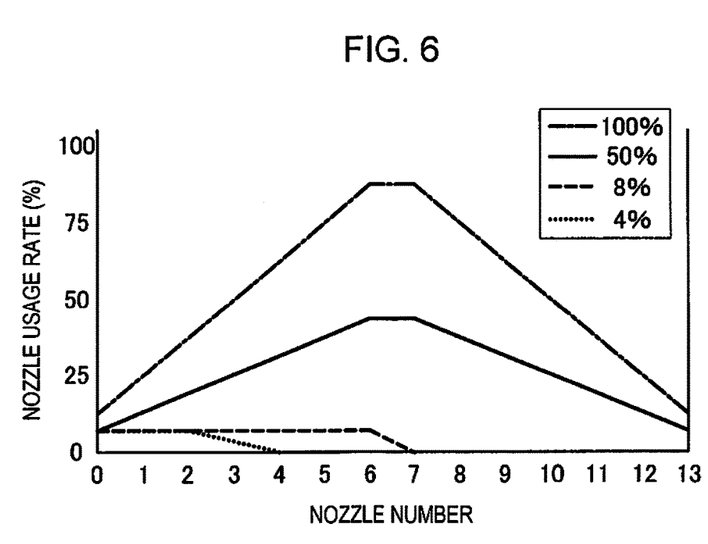
FIG. 6 is a diagram showing design values of nozzle usage rates of nozzles included in nozzle strings for chromatic ink.

FIG. 6 is a diagram showing design values of nozzle usage rates of the nozzles included in the nozzle strings for chromatic ink according to the first embodiment. Since the design values are expected values upon the design and vary for nozzle numbers, it is sufficient if the design values tend to be values shown in FIG. 6. In FIG. 6, the ordinate indicates a nozzle usage rate and the abscissa indicates a nozzle number. A nozzle usage rate of a certain nozzle indicates a probability at which a dot is formed by the certain nozzle. FIG. 6 shows the nozzle usage rates in cases where the ink duty is 100%, 50%, 8%, and 4%. If the ink duty is between two of those percentages, values calculated by linear interpolation from ink duty values shown in FIG. 6 are used for the nozzle numbers. If the ink duty is 4%, the succeeding nozzles having the nozzle numbers 0 to 3 are used to discharge the ink. If the ink duty is 8%, the nozzles having the nozzle numbers 0 to 6 and including the succeeding nozzles are used to discharge the ink. In the case where the chromatic ink is discharged as shown in FIG. 6, a small amount of the chromatic ink (refer to FIG. 4) can be discharged mainly by the succeeding nozzles, like the discharge of the chromatic ink in the case where the input gradation value is in a range of 224 to 255. In other words, when the amount of the chromatic ink discharged on a common printing region is smaller than a predetermined amount, the chromatic ink can be discharged mainly by the succeeding nozzles. In the cases where the ink duty is 50% and 100%, the usage rates of the nozzles may be set so that as a nozzle becomes closer to any of both ends of a nozzle string, the usage rate of the nozzle is reduced, and this setting may suppress the occurrence of banding in which a boundary between bands is recognized as a streak in each cycle of the sheet feeding. In the cases when the ink duty is 8% and 4%, this effect is eliminated. The banding noticeably occurs when the ink duty is middle or high. Thus, when the ink duty is such a low value, a large problem does not occur.

Figure 7:
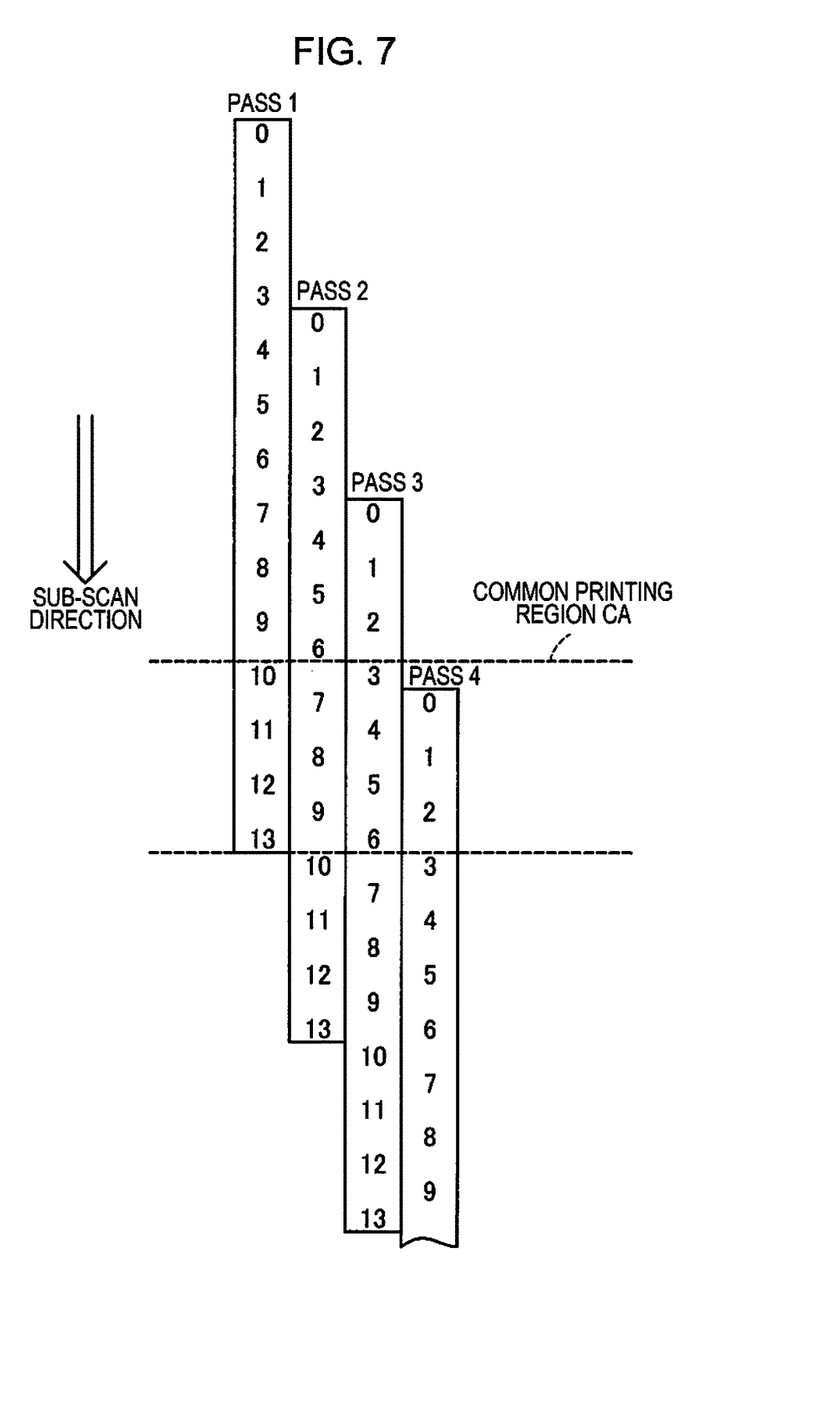
FIG. 7 is a diagram showing a state in which a nozzle string is relatively moved in a sub-scan for each pass.

FIG. 7 is a diagram showing a state in which a certain nozzle string is relatively moved in a sub-scan for each pass. FIG. 7 shows the state in which the nozzle string is moved relative to the printing medium. FIG. 7 shows the state in which the nozzle string is moved. However, if the printing medium is moved instead of the nozzle string, a direction toward which the printing medium is moved is opposite to a direction toward which the nozzle string is moved. In the first embodiment, each nozzle string including 14 nozzles (having nozzle numbers 0 to 13) is moved by a distance corresponding to 7 dots in each sub-scan (sheet feeding) for each main scan. In the first embodiment, by four main scans and three sub-scans, dots are formed in a common printing region CA and the common printing region CA is completed. The common printing region CA described in the first embodiment is a region having a width corresponding to 7 dots in the sub-scan direction. In the first embodiment, nozzles having a combination of the same nozzle numbers repeatedly appear in each cycle corresponding to 7 dots matching the sheet feeding amount in the sub-scan direction.

Since the common printing region CA is completed by the aforementioned driving and control of the print head 241, the nozzles having the nozzle numbers 10 to 13 are used for the first pass, the nozzles having the nozzle numbers 7 to 9 are used for the second pass, the nozzles having the nozzle numbers 3 to 6 are used for the third pass, and the nozzles having the nozzle numbers 0 to 2 are used for the fourth pass in the first embodiment. Thus, since the nozzles having the nozzle numbers 10 to 13 and the nozzles having the nozzle numbers 3 to 6 scan the same pixel positions in the first pass and the third pass, and the nozzles having the nozzle numbers 7 to 9 and the nozzles having the nozzle numbers 0 to 2 scan the same pixel positions in the second pass and the fourth pass, printing can be executed at the same pixel positions in either the first or third pass and can be executed at the same pixel positions in either the second or fourth pass. Thus, for example, expected values of the usage rates of the nozzles having the nozzle numbers 10 and 3 in the case where special consideration is not given to the side of halftones can be controlled so that dots are formed by the nozzle having the nozzle number 10 with a usage rate of 50% in the first pass and dots are formed by the nozzle having the nozzle number 3 with a usage rate of 50% in the fourth pass. In the first embodiment, the nozzle usage rates of the multiple nozzles included in the print head 241 are set based on an overlapping nozzle map described below.

Figure 8:
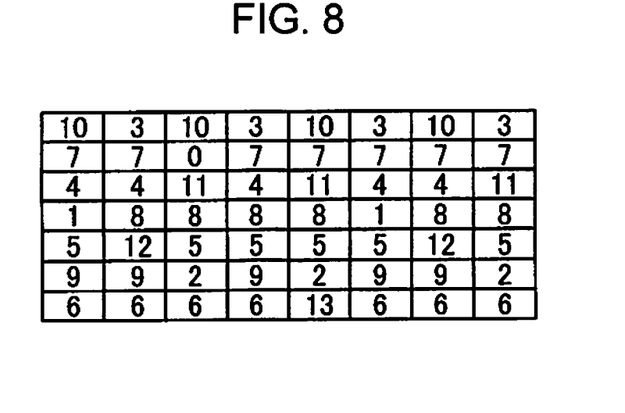
FIG. 8 is a diagram showing an example of an overlapping nozzle map.

FIG. 8 is a diagram showing an example of the overlapping nozzle map that is used to achieve characteristics when the ink duty shown in FIG. 6 is 100%. The overlapping nozzle map shown in FIG. 8 has a horizontal size of 8 in the main scan direction and a vertical size of 7 in the sub-scan direction. Cells shown in FIG. 8 indicates dots, respectively. Numbers indicated in the cells indicate nozzle numbers of nozzles that form the dots. Specifically, the positions of the dots to be formed on the printing medium uniquely correspond to the numbers of the nozzles that form the dots. When this overlapping nozzle map is repeatedly applied to the printing medium, pixel positions and the nozzles that forms the dots at the pixel positions can be specified. FIG. 8 shows the example of the nozzle map that indicates that a region to be scanned in the main scan direction is repeated in each cycle corresponding to 8 pixels and that the assignment rate of the nozzle with the number 5 is 75%, the assignment rate of the nozzle with the number 12 is 25%, the assignment rate of the nozzle with the number 0 is 12.5%, and the assignment rate of the nozzle with the number 7 is 87.5%, for example. If special consideration is not given on the side of halftones, the nozzles are used with the aforementioned assignment rates with a high probability, and it is possible to achieve halftones with usage rates shown in FIG. 6 and ranging between 100% and 50% as expected values. The assignment rates are values, each of which indicates the assignment rate of an overlapping nozzle indicated in the overlapping nozzle map. In order to obtain characteristics when the ink duty shown in FIG. 6 is lower than 50%, the usage rates need to be different from the assignment rates indicated in the overlapping nozzle map and a special halftone method to which special consideration is given needs to be used to cause the usage rates to be different from the assignment rates. The special halftone method is described later.

The size of the overlapping nozzle map may be larger than the size shown in FIG. 8 or may be smaller than the size shown in FIG. 8. If the horizontal size is increased, the assignment rates of the nozzles can be set in units of smaller percentages. It is desirable that the overlapping nozzle map be generated so that pixel positions at which dots are to be formed by a single main scan pass are treated as the same group and that pixel positions are evenly distributed and arranged without being biased in each group. In the arrangement within the nozzle map, however, the nozzle numbers may be regularly arranged or may be irregularly arranged. In addition, the vertical size is not limited to the size shown in FIG. 8 as long as the vertical size is a multiple of 7 that is the sheet feeding amount. Regarding the vertical size, the same repetitive cycle of a combination of corresponding nozzle numbers is the minimum unit. In the first embodiment, the minimum unit is 7. For example, if the sheet feeding amount is not constant and is alternately switched between 7 and 11, the repetitive cycle is the sum of 7 and 11 or is 18.

The printer driver 24 controls at least any of the usage rates of the nozzles included in the preceding nozzles and the usage rates of the nozzles included in the succeeding nozzles and controls the amount of at least the chromatic (C, M, and Y) ink to be discharged onto the printing target region. In addition, if the amount of the black ink discharged on the printing target region is larger than the predetermined amount, the printer driver 24 causes the print head 241 to discharge a smaller amount of the chromatic (C, M, and Y) ink than the amount of the discharged black ink onto the printing target region from the multiple nozzles so that the amount of the chromatic ink discharged from the succeeding nozzles is larger than the amount of the chromatic ink discharged from the preceding nozzles. Hereinafter, a printing process is described in detail.

Figure 9:
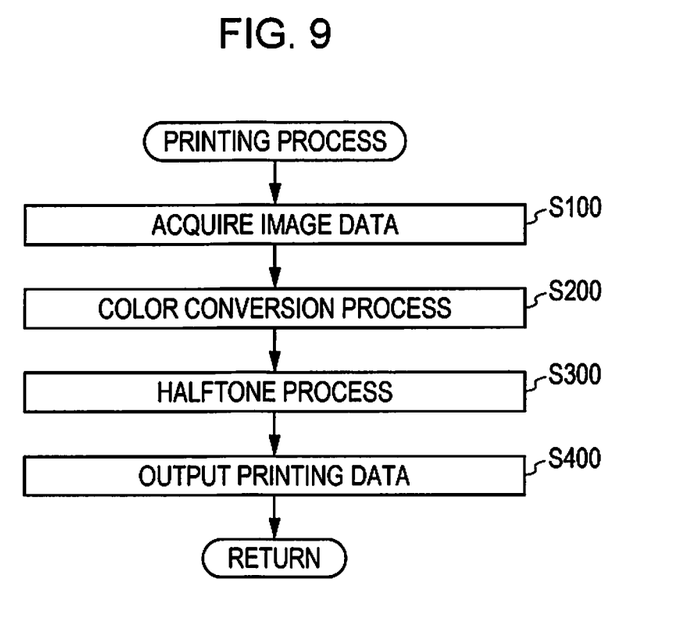
FIG. 9 is a flowchart of a printing process to be executed by a computer.

FIG. 9 is a flowchart of the printing process to be executed by the computer 100 according to the first embodiment. The printing process is executed by causing the CPU 102 as hardware to execute a program prepared as the printer driver 24. The program may be stored in a memory of the computer 100 or may be recorded in various recording media from which the computer 100 can read the program. In the printing process, the computer 100 uses the image acquisition module 40 to acquire image data IMG in RGB format or monochrome format from the application program 20 (in step S100). Step S100 is also referred to as "acquisition process".

When acquiring the image data, the computer 100 uses the color conversion module 42 to execute a color conversion process of converting the image data acquired in step S100 to image data in CMYK format and determines image data (ink duty) of each color (in step S200). If the input image data is in RGB format, the computer 100 references a three-dimensional lookup table for receiving RGB values and outputting ink duties of the ink of the colors and determines the ink duties, corresponding to the input image data, of the cyan, magenta, yellow, and black ink. If the input image data is in monochrome format, the computer 100 uses a table indicating the relationships (shown in FIGS. 4 and 5) between the input gradation value described with reference to FIGS. 4 and 5 and the ink duties, and determines the ink duties of the black and chromatic ink.

Upon the reference of the three-dimensional lookup table, the following method may be used: a method of executing tetrahedral interpolation based on four neighboring grid points for ink amounts to be output and corresponding to RGB values between grid points on the basis of a lookup table corresponding to only RGB values on grid points appropriately separated from each other, instead of using a lookup table corresponding to all combinations of RGB values. In addition, if the input image data is in RGB format, the three-dimensional lookup table is referenced and single-dimensional lookup tables shown in FIGS. 4 and 5 are not used. When output ink amounts corresponding to RGB values equal to each other on a monochrome axis are extracted from the three-dimensional lookup table, graphs equivalent with those shown in FIGS. 4 and 5 can be obtained. In this case, since the logic of light and dark tones is reversed, the left ends of the abscissas shown in FIGS. 4 and 5 indicate that R=G=B=255, and the right ends of the abscissas shown in FIGS. 4 and 5 indicate that R=G=B=0.

When the image data in CMYK format is obtained, the computer 100 uses the halftone module 44 to execute the halftone process using the dither mask DM for each of cyan (C), magenta (M), yellow (Y), and black (K) colors (in step S300). In the first embodiment, in order to achieve the aforementioned special halftone method, the dither mask DM with a threshold arrangement optimized in synchronization with the overlapping nozzle map shown in FIG. 8 is used to simultaneously execute the halftone process and the determination of the usage rates of the nozzles. Specifically, if the ink duty is equal to or lower than 50%, horizontal and vertical sizes of the dither mask DM are set to be equal to integral multiples of the horizontal and vertical sizes of the overlapping nozzle map, and nozzle numbers corresponding to positions on the dither mask DM are uniquely determined. Then, the overlapping nozzle map shown in FIG. 8 is referenced and the dither mask DM is generated in advance so that the rate at which small thresholds for causing dots to be easily formed are arranged at the positions of the nozzle numbers of the succeeding nozzles is high. Thus, the characteristics obtained in the cases where the ink duty shown in FIG. 6 is 8% and 4% are achieved. A method of setting thresholds of the dither mask is described in Japanese Patent No. 5633110, for example. In the first embodiment, the halftone module 44 uses the dither mask DM to execute the halftone process with an ordered dither method, but may execute the halftone process with another method such as an error diffusion method.

When the halftone process is terminated, the computer 100 uses the printing data output module 46 to output, as printing data, the image data, subjected to the halftone process, of the cyan, magenta, yellow, and black colors to the printer 200 (in step S400). In this case, the computer 100 references the overlapping nozzle map and causes data specifying nozzles for forming dots at pixel positions to be included in the printing data. Step S400 is also referred to as "dot formation process".

The printer 200 receives the printing data, drives the print head 241 while treating the nozzle pitch as "2" and the sheet feeding amount as "7" as described above, and causes the nozzles specified in the printing data to discharge the ink of the colors upon forward and backward movements of the print head 241, thereby executing bidirectional printing.

In the aforementioned printing process, not only the black ink but also a small amount of the chromatic ink are discharged to print a black color with a high density. In this case, if the same position of a printed region on the printing medium is paid attention, the chromatic ink has been discharged mainly by succeeding nozzles. In other words, if the same position of the printed region that is located on the printing medium and on which a small amount of the chromatic ink is discharged is paid attention, the discharge of the chromatic ink is relatively delayed, compared with the discharge of the black ink. Thus, when a dark black color is output using the black ink containing a small amount of the resin composition, the chromatic ink containing large amounts of the resin compositions can remain on the surface of the printing medium. It is, therefore, possible to suppress the diffused reflection of light and suppress the occurrence of gloss unevenness. Especially, since the serial printer executes the bidirectional printing in the first embodiment, an effect that is referred to as "gloss banding" in which gloss unevenness is recognized in each band may easily occur. In the first embodiment, however, since the diffused reflection of light can be suppressed as described above, the occurrence of the gloss banding can be suppressed. In addition, according to the first embodiment, since gloss unevenness is suppressed by the chromatic ink, even a printer that does not have achromatic ink (for example, light gray ink) other than black ink can suppress the occurrence of gloss unevenness.

In the first embodiment, when the special halftone method is used, thresholds corresponding to positions at which dots are formed by the succeeding nozzles for discharging the chromatic ink are set to values that cause dots to be more easily formed than thresholds corresponding to positions at which dots are formed by the preceding nozzles among multiple nozzles for discharging the chromatic ink in the dither mask DM, and the halftone process and the determination of the usage rates of the nozzles can be simultaneously executed by only using the dither mask DM. Thus, the speed of the process can be increased.

B. Second Embodiment

Figure 10:
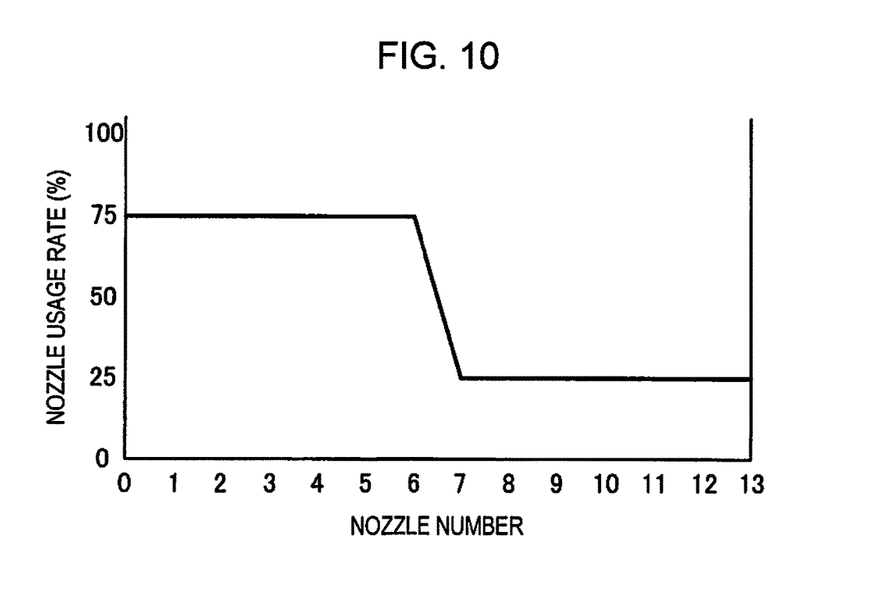
FIG. 10 is a diagram showing design values of the nozzle usage rates of the nozzles included in the nozzle strings for chromatic ink according to a second embodiment.
Figure 11:
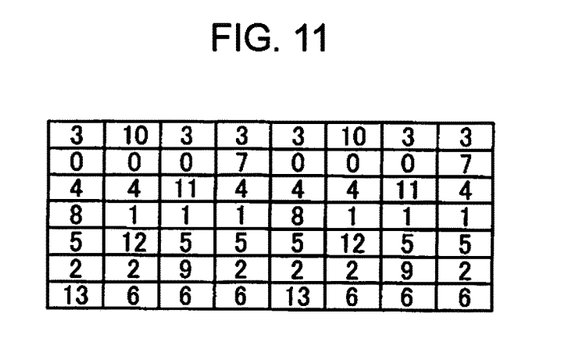
FIG. 11 is a diagram showing an example of the overlapping nozzle map.

In the aforementioned first embodiment, the special halftone is used. On the other hand, in a second embodiment, a special halftone method is not used and only an overlapping nozzle map is used to set the usage rates of the nozzles. FIG. 10 is a diagram showing design values of the nozzle usage rates of the nozzles for chromatic ink according to the second embodiment. FIG. 11 is a diagram showing an example of the overlapping nozzle map that is used to achieve ink duty characteristics shown in FIG. 10. As shown in FIG. 6, in the first embodiment, the nozzle usage rates are changed based on the nozzle numbers. On the other hand, in the second embodiment, as shown in FIG. 10, nozzle usage rates of nozzles to be used for the same pass are equal to each other. In the example shown in FIG. 10, the nozzles with the nozzle numbers 0 to 6 are used for the same pass, and the usage rates of the nozzles with the nozzle numbers 0 to 6 are 75% and constant. In addition, the nozzles with the nozzle numbers 7 to 13 are used for the same pass carried out immediately before the pass in which the nozzles with the nozzle numbers 0 to 6 are used, and the usage rates of the nozzles with the nozzle numbers 7 to 13 are 25% and constant.

In the second embodiment, the usage rates of the succeeding nozzles to be used to add small amounts of the chromatic ink to the black ink are increased as indicated in the overlapping nozzle map shown in FIG. 11. The overlapping nozzle map is used to increase the usage rates of the succeeding nozzles for all ink duties. By executing this control, the occurrence of gloss unevenness can be suppressed, like the first embodiment. A color close to the black color may be detected from the input data, and the overlapping nozzle map shown in FIG. 11 may be used only upon the output of the color close to the black color.

C. Third Embodiment

In the aforementioned first embodiment, the overlapping nozzle map is used to set the usage rates of the nozzles. On the other hand, in a third embodiment, an overlapping nozzle map is not used and the usage rates of the nozzles are set in units of pixels with a high probability. For example, FIG. 6 shows the nozzle usage rates of the nozzles with the nozzle numbers in the cases where the ink duty is 100%, 50%, 8%, and 4%. The nozzle usage rates of the nozzles when the ink duty is another value not shown in FIG. 6 may be determined in the same manner as described above. Alternatively, if a method of executing the linear interpolation for each nozzle number based on the characteristics of the determined values of the ink duty to calculate characteristics of values between the determined values is defined, the nozzle usage rates of the nozzles with the nozzle numbers when the ink duty is an arbitrary value can be determined.

For example, an expected value of a nozzle usage rate of a nozzle number (nw) that corresponds to an input gradation value (Input Duty(x, y)) of a pixel position (x, y) is obtained as a function of the input gradation value and the nozzle number according to Formula (1).

$$\text{Nozzle On Duty(Input Duty}(x,y),nw) \tag{1}$$

For example, in the case where dots are formed as shown in FIG. 7, if a pixel position in the sub-scan direction that corresponds to the nozzle number 0 shown on the upper left side in FIG. 8 is indicated by y=1, nozzle numbers nw1(y) and nw2(y) of two nozzles capable of forming dots at an arbitrary pixel position y in the sub-scan direction are obtained according to Equations (2) and (3), where "1" indicates an operator for calculating a remainder.

If $y$ is an even number,$nw1(y)=(y/2+3)\%7$, and $nw2(y)=nw1(y)+7$  (2)

If $y$ is an odd number,$nw1(y)=((y-1)/2)\%7$, and $nw2(y)=nw1(y)+7$  (3)

In this case, since the total of the usage rates of the overlapping two nozzles is equal to an input gradation value of the pixel position, the following Equation (4) is established.

Input Duty$(x,y)$=Nozzle On Duty(Input Duty$(x,y)$, $nw1(y)$)+Nozzle On Duty(Input Duty$(x,y)$,$nw2(y)$)  (4)

In the third embodiment, a process of binarizing input gradation values of pixel positions is executed by a general halftone process such as an error diffusion method or a dither method. Whether the overlapping nozzle nw1(y) or the overlapping nozzle nw2(y) is used to discharge ink at pixel positions may be determined according to Formulas (5) and (6) by generating a real random number (rand( )) in a range of 0 to 1 for each of the pixel positions, for example.

If rand( )<Nozzle On Duty(Input Duty$(x,y)$,$nw1(y)$)/ Input Duty$(x,y)$,$nw1$ is used.  (5)

If rand( )≥Nozzle On Duty(Input Duty$(x,y)$,$nw1(y)$)/ Input Duty$(x,y)$,$nw2$ is used.  (6)

According to the third embodiment, the characteristics shown in FIG. 6 can be achieved for the nozzle usage rates of the nozzles with the nozzle numbers without the use of an overlapping nozzle map.

D. Modified Examples

First Modified Example

In the aforementioned embodiments, the pigments are used as the color materials of the ink, but dyes may be used as the color materials of the ink.

Second Modified Example

In the aforementioned embodiments, the printing is executed in the printing system 10 including the computer 100 and the printer 200. On the other hand, the printer 200 may receive the image data from the digital camera or various memory cards and execute the printing. Specifically, the CPU 102 included in the control circuit 260 of the printer 200 may execute the printing by executing processes equivalent with the aforementioned printing process and the halftone process.

Third Modified Example

In the aforementioned embodiments, only when the input gradation value of the black ink is equal to the maximum value or is a value (for example, 95% of the maximum input gradation value or greater) close to the maximum value, the chromatic ink may be discharged from the succeeding nozzles.

Fourth Modified Example

In the aforementioned embodiments, the number of overlapping nozzles, the nozzle pitches, the sheet feeding amount, and a printing mode (bidirectional printing mode) are an example, and these parameters may be set to arbitrary values. For example, the printing mode may be a unidirectional printing mode in which the ink is discharged only upon a forward or backward movement of the print head.

The invention is not limited to the aforementioned embodiments and the modified examples and may be achieved by various configurations without departing from the gist of the invention. For example, the technical characteristics described in the embodiments and the modified examples and corresponding to the technical characteristics according to the aspects described in SUMMARY may be replaced or combined in order to solve the aforementioned problems or achieve a part or all of the aforementioned effects as necessary. In addition, if at least any of the technical characteristics is not described as a necessary characteristic in the present specification, the technical characteristic may be removed as necessary.

This application claims priority under 35 U.S.C. § 119 to Japanese Patent Application No. 2016-181209, filed Sep. 16 2016. The entire disclosure of Japanese Patent Application No. 2016-181209 is hereby incorporated herein by reference.

What is claimed is:

1. A printing apparatus comprising:
a print head that has a plurality of nozzles capable of discharging black ink and chromatic ink and is driven relative to a printing medium in a main scan direction that is a width direction of the printing medium and in a sub-scan direction intersecting the main scan direction;
an acquiring section that acquires image data; and
a dot forming section that forms dots based on the image data on the printing medium by causing the print head to discharge the ink onto the printing medium while causing the print head to scan a common printing region in the main scan direction multiple times,
wherein the plurality of nozzles includes preceding nozzles that discharge the ink onto the printing medium before the ink discharge of the other nozzles, and succeeding nozzles that discharge the ink onto the printing medium after the ink discharge of the preceding nozzles,
wherein the dot forming section controls a usage rate of at least any of nozzles included in the preceding nozzles and nozzles included in the succeeding nozzles and controls the amount of at least the chromatic ink to be discharged onto a printing target region in a preceding pass in which a scan is executed in the main scan direction while dots are formed using the preceding nozzles and a succeeding pass in which a scan is executed in the main scan direction while dots are formed using the succeeding nozzles, and
wherein, if the amount of the black ink discharged on the printing target region is larger than a predetermined amount, the dot forming section causes the print head to discharge a smaller amount of the chromatic ink than the amount of the discharged black ink onto the printing target region from the plurality of nozzles so that the amount of the chromatic ink discharged from the succeeding nozzles is larger than the amount of the chromatic ink discharged from the preceding nozzles.

2. The printing apparatus according to claim 1,
wherein if the amount of the chromatic ink discharged on the printing target region is smaller than a predetermined amount, the dot forming section causes the print head to discharge the chromatic ink from at least any of the plurality of nozzles so that the amount of the chromatic ink discharged from the succeeding nozzles is larger than the amount of the chromatic ink discharged from the preceding nozzles.

3. The printing apparatus according to claim 1,
wherein the dot forming section determines the formation of dots by comparing a plurality of thresholds included in a dither mask with pixel data forming the image data, and
wherein, in the dither mask, thresholds corresponding to positions at which dots are formed by the succeeding nozzles that discharge the chromatic ink are set to values that cause dots to be more easily formed than thresholds corresponding to positions at which dots are formed by the succeeding nozzles that discharge the chromatic ink and are among the plurality of nozzles.

4. A printing method for relatively driving a print head having a plurality of nozzles capable of discharging black ink and chromatic ink with respect to a printing medium in a main scan direction that is a width direction of the printing medium and in a sub-scan direction intersecting the main scan direction and executing printing, comprising:
an acquisition process of acquiring image data; and
a dot formation process of forming dots based on the image data on the printing medium by causing the print head to discharge the ink onto the printing medium while causing the print head to scan a common printing region in the main scan direction multiple times,
wherein the plurality of nozzles includes preceding nozzles that discharge the ink onto the printing medium before the ink discharge of the other nozzles, and succeeding nozzles that discharge the ink onto the printing medium after the ink discharge of the preceding nozzles,
wherein, in the dot formation process, a usage rate of at least any of nozzles included in the preceding nozzles and nozzles included in the succeeding nozzles is controlled and the amount of at least the chromatic ink to be discharged onto a printing target region is controlled in a preceding pass in which a scan is executed in the main scan direction while dots are formed using the preceding nozzles and a succeeding pass in which a scan is executed in the main scan direction while dots are formed using the succeeding nozzles, and
wherein, if the amount of the black ink discharged on the printing target region is larger than a predetermined amount, a smaller amount of the chromatic ink than the amount of the discharged black ink is discharged onto the printing target region from the plurality of nozzles so that the amount of the chromatic ink discharged from the succeeding nozzles is larger than the amount of the chromatic ink discharged from the preceding nozzles.

5. A non-transitory computer readable medium for storing program for causing a printing apparatus to relatively drive a print head having a plurality of nozzles capable of discharging black ink and chromatic ink with respect to a printing medium in a main scan direction that is a width direction of the printing medium and in a sub-scan direction intersecting the main scan direction and execute printing, comprising:
an acquisition function of acquiring image data; and
a dot formation function of forming dots based on the image data on the printing medium by causing the print head to discharge the ink onto the printing medium while causing the print head to scan a common printing region in the main scan direction multiple times,
wherein the plurality of nozzles includes preceding nozzles that discharge the ink onto the printing medium before the ink discharge of the other nozzles, and succeeding nozzles that discharge the ink onto the printing medium after the ink discharge of the preceding nozzles,
wherein the dot formation function controls a usage rate of at least any of nozzles included in the preceding nozzles and nozzles included in the succeeding nozzles and controls the amount of at least the chromatic ink to be discharged onto a printing target region in a preceding pass in which a scan is executed in the main scan direction while dots are formed using the preceding nozzles and a succeeding pass in which a scan is executed in the main scan direction while dots are formed using the succeeding nozzles, and
wherein, if the amount of the black ink discharged on the printing target region is larger than a predetermined amount, the dot formation function causes the print head to discharge a smaller amount of the chromatic ink than the amount of the discharged black ink onto the printing target region from the plurality of nozzles so that the amount of the chromatic ink discharged from the succeeding nozzles is larger than the amount of the chromatic ink discharged from the preceding nozzles.

* * * * *